Figure 1:
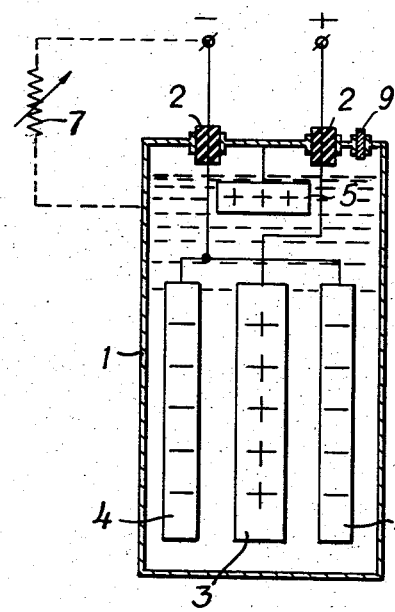

United States Patent Office 2,857,447
Patented Oct. 21, 1958

2,857,447

HERMETICALLY CLOSED STORAGE CELL

Karl Göran Hugo Lindström, Oskarshamn, Sweden, assignor to Svenska Ackumulator Aktiebolaget Jungner, Stockholm, Sweden, a corporation of Sweden Application July 25, 1955, Serial No. 524,120

Claims priority, application Sweden April 1, 1955

6 Claims. (Cl. 136—34)

This invention relates generally to hermetically sealed storage cells and more particularly to a method of manufacturing said cells so that dangerous hydrogen gas will not be developed during the charging of the cell.

In the charging of hermetically-sealed storage cells it is desired that only oxygen gas be allowed to be developed, which gas should be completely absorbed by the active material of the negative electrode. The limitations on cell charging are that the oxygen gas should be absorbed as rapidly as it is formed and that the heat developed should be rapidly removed. The negative electrode should never be permitted to become fully charged since dangerous hydrogen gas will develop in such case.

A requirement in the charging of cells of this kind is that the state of charge of the electrodes is such that under the influence of the same charging current through both electrodes the positive electrode is the first to be completely charged. This holds true whether the capacity of the negative electrode is greater, equal to, or smaller than that of the positive one. Upon closure of the cell the charging conditions should also be such that the positive electrode is the first to be fully charged. The positive electrode shall thus be charged more than the negative electrode to a certain extent, when the cell is closed. If the negative electrode is to have a higher capacity than that of the positive electrode it is preferred that both electrodes be completely discharged at the time of closure, and in case of an equal capacity of both of the electrodes, or in case of a smaller capacity of the negative electrode than that of the positive one, it is preferred to have the negative electrode completely charged to an extent corresponding at least to the difference in available capacity between the positive and the negative electrodes.

It is comparatively expensive, however, to bring about the desired state of charge of the electrodes when inserting them into the cell vessel. In the case of sintered electrodes for alkaline batteries, for example, such electrodes come from the manufacturing process in such a condition that the positive electrodes are completely discharged and the negative electrodes are discharged to about half of their capacity. If it is not desired to change the manufacturing process it consequently becomes necessary to discharge the negative electrodes by immersing them in electrolyte and to discharge them by means of another electrode and to wash and dry them. The washing and drying procedures are relatively time-wasting and expensive processes.

In case the positive electrode has a higher capacity, then for this electrode, too, the additional process of charging the same to a certain extent is involved according to the above. Here, too, washing and drying are involved in addition to an accurate control of the charging quantity with special precautionary measures in order that the desired degree of charging shall be maintained unchanged during washing, drying, and perhaps storing prior to placing the electrodes into the cell.

According to the above it is thus advantageous from an economical and technical point of view to cause the electrode plates to be inserted into the cell vessel at an arbitrary charged condition and this problem has reached its complete solution by the conception of the present invention.

According to the invention the cell has provided therein a means which upon the closure of the cell is capable of giving off oxygen to the active material of one of the electrodes. Said means may be of various kinds. According to one embodiment of the invention an auxiliary electrode with an active material in a charged condition is positioned in the cell to give off oxygen during charging of the cell. According to a further embodiment of the invention the oxygen producing means consists of a chemical oxidation agent, preferably of a superoxide or a peroxide. By means of the auxiliary electrode or the oxidation agent it will be possible upon closure of the cell to bring about an oxidation of the active material of one or both of the electrodes so that the negative electrode is prevented from becoming fully charged before the positive one.

Figure 2:
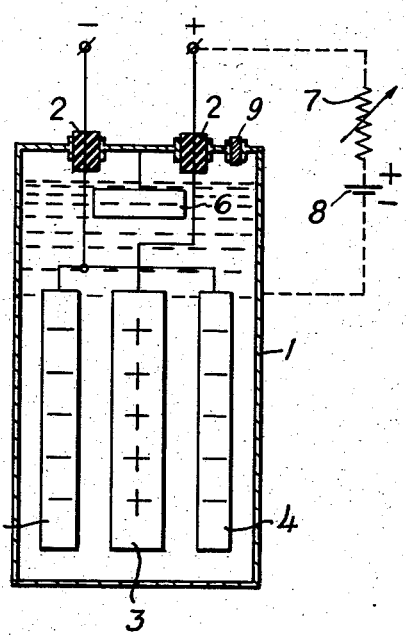
Figure 3:
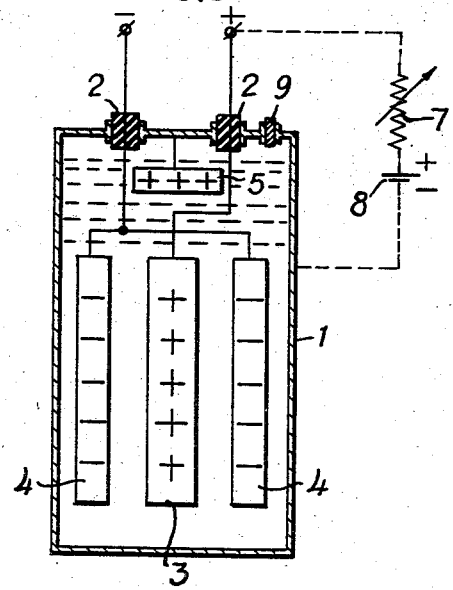

In the accompanying drawing Figs. 1, 2 and 3 are diagrammatic representations of three different examples of embodiment of cells with an auxiliary electrode according to the invention.

As indicated in Fig. 1, the cell vessel 1 is made from a conducting material such as sheet iron and contains a positive electrode 3 positioned intermediate the negative electrodes 4. The vessel is maintained in a gas-tight hermetically-sealed condition by the insulating members 2 positioned about the electrical terminals connected to the electrodes. According to the invention an auxiliary electrode 5 containing a certain quantity of an active positive electrode material is positioned within the cell vessel 1. A resistor 7 is connected across the cell casing and the negative terminal as shown to insure a partial discharge of the negative electrode as will be described in greater detail below.

In the embodiment of Fig. 2 an auxiliary electrode 6 containing an active negative electrode material is positioned in the cell vessel and the outer electrical circuit includes a variable resistor 7 in series with an auxiliary battery 8 connected across the cell casing and the positive terminal.

Referring to Fig. 1, the manufacturing process will proceed so that the electrodes 3, 4 are placed into the vessel in any charged condition, said vessel being advantageously filled with an electrolyte-powder mixture according to the U. S. patent application Ser. No. 496,928, filed on the 25th day of March 1955, of such a level in the vessel that the auxiliary electrode 5 will also come into contact with the electrolyte. Optionally it is possible, and if for instance a rigid electrode separator is to be used, to surround the auxiliary electrode with an electrolyte-proof and porous cloth which will contact the electrolyte and become moistened thereby to become the conductor of current. In the chosen example, the auxiliary electrode 5 should be charged to a desired extent at the time of closure. Before the cell is closed by means of vent 9 in the wall of the vessel, for example the electrode assembly is now charged by the auxiliary electrode so that electrodes 3, 4 become completely charged; any gas formed during charging escapes through the vent and, if desired, may be removed by suitable vacuum means. After the operator has made sure that the air has been displaced by gas, the cell is closed and charging is discontinued. The outer circuit containing the resistor 7 connected as shown in Fig. 1 will serve to discharge the negative electrodes by a desired amount. An ammeter or an ampere-hour meter may be connected in series with the resistor to measure the degree of discharge of the electrodes. Any remaining charge existing upon auxiliary electrode 5 will also be discharged at this time. The capacity of the negative electrodes are discharged by approximately 10 to 20% of full capacity and thus it is guaranteed that the negative electrode will not become completely charged prior to complete charging of the positive electrode so that hydrogen gas will not be developed. It is of course possible to perform the discharging of the auxiliary electrode 5 and of the negative electrode before the cell is closed, but for reasons to be developed hereinafter this is highly unsuitable in batteries with an alkaline electrolyte and particularly so if one uses a lithium admixture to the electrolyte. In charging the cell in an open condition the developed gases displace the air from the cell but after the charging has been interrupted such gases, especially the oxygen gas, tend to become absorbed by the electrodes. By closing the cell at this time, the air is prevented from being sucked back into the cell. The oxygen gas is absorbed with particular rapidity if the negative electrode of the cell is also discharged. Should the air be sucked into the cell, carbon dioxide will also be entrained, and this has an undesirable carbonizing effect on the electrolyte, especially on a liquor containing lithium. Moreover, it is always disadvantageous to have air within the cell from the point of view that the nitrogen of the air is never absorbed by the electrodes and consequently brings about an approximately 0.8 kilogram per square centimeter higher inner gas pressure which calls for higher demands on packings and the strength of the vessel.

The above disclosure constitutes only one example of the application of the invention. Another embodiment of my invention shown in Fig. 2 is, instead of charging the electrodes completely prior to the closure, to charge the cell in such manner that the negative electrode is charged to about 80% of its full capacity and, upon closure, and with the aid of an outer source of current 8, to charge the positive electrode entirely against the auxiliary electrode 6, which electrode in this case should contain substantially non-charged negative active material. In the circuit according to Fig. 2, it will also be possible as in the first example to charge both electrodes completely and then to discharge the negative-electrode upon closure of the cell with the aid of oxygen gas developed at the positive electrode when the latter is charged further against the auxiliary electrode 6. The positive electrode may also be charged or the negative electrode discharged with the aid of oxygen gas in the circuit according to Fig. 3, where the auxiliary electrode is positively charged.

There are further variants of these modes of procedure, but the principle is the same and the examples selected are those which are the most suitable in practice.

In all cases it holds true that the auxiliary electrode or electrodes should be located above or below the electrode complex or laterally thereof, so that the edges of the plates face the same so as to provide as uniform a current distribution as possible to the various electrode plates upon the passage of the current. For the same purpose the current used should be as low as possible, and charging periods of up to twenty-four hours or more have proven to be advantageous. A further advantage of a low current in this case resides in that the auxiliary electrode can be made with rather a high inner resistance, that is to say of a rather great thickness, and may in this way more easily be given a suitable shape in adaptation to a suitable reserve space and be placed into the latter within the cell, for instance between the pole bolts in the top of the cell vessel. In a suitable embodiment, the auxiliary electrode may constitute a portion of the wall or walls of the cell vessel in the form of a sinter electrode at vessel walls of sheet metal, such electrodes being made by sintering metal powder at the wall, and subsequently impregnating the sintered metal with active material.

The statements hereinbefore as regards constructions with an auxiliary electrode also hold true in applicable parts for chemical oxidation agents. These are introduced into the cell prior to the closure of the same but should be selected or arranged in such manner as to become active only after cell closure. This avoids the risk of the oxidation agent developing free oxygen gas having time to escape prior to the closure so as to cause uncertainty as to the ultimately obtained charging condition. The oxidation agent may contain one or a few superoxides or peroxides of metals. Instead it may contain one or a few superoxides or peroxides of metalloids or of salts of the latter. Certain organic superoxides are also serviceable. In certain cases mixtures of some of these superoxides or peroxides may also be used. As examples might be mentioned peroxides or superoxides of alkali metals or alkaline earth metals, magnesium superoxides ($MgO_2$), hydrogen peroxide ($H_2O_2$), alkali metal permanganates, alkali metal perborates and benzoylperoxide.

The oxidation agent should preferably be of a nature such that no substances detrimental to the cell or to the function thereof can be formed, when the agent is used in contact with the electrolyte. Particularly in connection with organic superoxides the risk may be incurred that readily reducible compounds are formed. The oxidation agent, for instance with respect to $MgO_2$, may give a final product which is insoluble in the electrolyte and is also non-conducting or, the final product may be soluble and desirable in the electrolyte, as is the case with the use of alkaline peroxides and superoxides as oxidation agents. Certain of the oxidation agents react so violently with the electrolyte at the development of oxygen gas that dangerous pressures may be created in the cell. To avoid this and to reduce the rate of the reaction, the oxidation agent may for instance, be enclosed within a container with a hole or porous wall or part of a wall, the reaction being thus retarded. To the same end, the oxidation agent may be mixed with a substance which is dissolved slowly in the water. Other retarding agents such as negative catalysts or inhibitors may also be used.

Certain other oxidation agents may act too slowly during the whole of the oxidation process or are inert so that starting of the reaction is retarded. In these cases the oxidation agent may be activated from the outside upon closure of the cell which may be effected in a variety of ways for instance by heating, shaking, actuation by means of supersonic sounds, or by electric or magnetic fields, by irradiation by means of radioactive rays, and so forth. Depending on the nature of the dullness of the oxidation agent such actuation takes place only in the beginning of the oxidation process or during the whole of the time until the oxidation has been completed.

What I claim is:

1. A method of manufacturing hermetically-sealed alkaline storage cells having an electrolyte and positive and negative main porous gas-absorbing electrodes, comprising the steps of mounting the main electrodes in the cell vessel, then completely charging the positive and negative main electrodes, then sealing the vessel hermetically, and thereafter controllably partially discharging by oxygen absorption the negative main electrode by at least 10% of its full capacity by oxidation means in the cell vessel capable of being reduced prior to use of the cell in normal operation while maintaining the full charge on said positive main electrode.

2. A method of manufacturing hermetically-sealed alkaline storage cells of the type wherein the gas developed during charging of the cell is absorbed by the active material of the main electrodes, comprising the steps of placing positive and negative main electrodes into an electrically-conductive cell vessel and placing an auxiliary electrode having an active material in said vessel, said auxiliary electrode being electrically connected to the cell vessel, then adding an electrolyte to the cell vessel, then completely charging said positive and negative main electrodes, then sealing the cell hermetically, and thereafter electrically activating said auxiliary electrode to deliver oxygen to said negative main electrode to reduce its capacity of charge by a substantial amount up to 20% of its full capacity prior to use of the cell in normal operation.

3. A method of manufacturing hermetically-sealed alkaline storage cells of the type wherein the gas developed during charging of the cell is absorbed by the active material of the main electrodes, comprising the steps of placing positive and negative main electrodes into an electrically-conductive cell vessel and placing an auxiliary electrode containing a substantially-charged positive active mass in said vessel, said auxiliary electrode being insulated from said positive and negative main electrodes and being electrically connected to the cell vessel, then adding an electrolyte to the cell vessel, then completely charging said positive and negative main electrodes while venting from the vessel the gases produced by charging, then sealing the cell hermetically, and thereafter temporarily connecting one end of a resistor circuit to the cell vessel and the other end to the electrical lead of the negative main electrode to partially reduce the capacity of charge of said negative main electrode by approximately 10 to 20% of its full capacity prior to use of the cell in normal operation.

4. A method of manufacturing hermetically-sealed alkaline storage cells of the type wherein the gas developed during charging the cell is absorbed by the active material of the main electrodes, comprising the steps of placing positive and negative main electrodes into an electrically-conductive cell vessel and placing an auxiliary electrode containing a substantially discharged negative active mass in said vessel, said auxiliary electrode being insulated from said positive and negative main electrodes and being electrically connected to the cell vessel, then adding an electrolyte to the cell vessel, then completely charging said positive and negative main electrodes while venting from the vessel the gases produced by charging, then sealing the cell hermetically, and thereafter temporarily connecting the negative terminal of a direct current voltage source to the cell vessel and the positive terminal of the voltage source to the electrical lead of the positive main electrode to activate said auxiliary electrode and to partially reduce the capacity of charge of the negative main electrode by approximately 10 to 20% of its full capacity prior to use of the cell in normal operation while maintaining full charge on said positive main electrode.

5. A method of manufacturing hermetically-sealed alkaline storage cells of the type wherein the gas developed during charging of the cell is absorbed by the active material of the main electrodes, comprising the steps of placing positive and negative main electrodes into an electrically-conductive cell vessel and placing an auxiliary electrode containing a substantially-charged positive active material in said vessel, said auxiliary electrode being insulated from said positive and negative main electrodes and being electrically connected to the cell vessel, then adding an electrolyte to the cell vessel, then completely charging said positive and negative main electrodes while venting the gases produced by the charging from the vessel, then sealing the cell hermetically, and thereafter temporarily connecting the negative terminal of a direct-current voltage source to the cell vessel and the positive terminal to the electrical lead of the positive electrode to partially reduce the capacity of charge of the negative main electrode by approximately 10 to 20% of its full capacity prior to use of the cell in normal operation, while maintaining the full charge on said positive main electrode.

6. The method of manufacturing hermetically-sealed alkaline storage cells of the type wherein the gas developed during charging of the cell is absorbed by the active material of the electrodes, comprising the steps of placing into a cell vessel positive and negative main electrodes each containing active material, then adding an electrolyte to the cell vessel, then completely charging said main electrodes, then adding a chemical oxidation agent to the cell vessel selected from the group consisting of peroxides and superoxides of alkali metals and alkaline earth metals, magnesium superoxides ($MgO_2$), hydrogen peroxide ($H_2O_2$), alkali metal permanganates, alkali metal perforates and benzoyl peroxide, and thereafter sealing the cell hermetically, said oxidation agent serving to partially reduce the capacity of charge of the negative main electrode by a substantial amount prior to use of the cell in normal operation without affecting the full charge on the positive main electrode.

References Cited in the file of this patent

UNITED STATES PATENTS

| | | |
|---|---|---|
| 2,104,973 | Dassler | Jan. 11, 1938 |
| 2,131,592 | Lange et al. | Sept. 27, 1938 |
| 2,578,027 | Tichenor | Dec. 11, 1951 |
| 2,614,138 | Jacquier | Oct. 14, 1952 |

FOREIGN PATENTS

| | | |
|---|---|---|
| 285,622 | Great Britain | Feb. 23, 1928 |